(12) United States Patent
Lam

(10) Patent No.: US 10,896,675 B1
(45) Date of Patent: Jan. 19, 2021

(54) MULTI-TIERED COMMAND PROCESSING

(71) Applicant: X Development LLC, Mountain View, CA (US)

(72) Inventor: Daniel Alex Lam, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 183 days.

(21) Appl. No.: 16/024,350

(22) Filed: Jun. 29, 2018

(51) Int. Cl.
| | |
|---|---|
| *G10L 15/22* | (2006.01) |
| *G10L 15/08* | (2006.01) |
| *G10L 15/30* | (2013.01) |
| *B25J 13/00* | (2006.01) |
| *G10L 25/51* | (2013.01) |
| *G10L 15/26* | (2006.01) |

(52) U.S. Cl.
CPC ............ *G10L 15/22* (2013.01); *B25J 13/003* (2013.01); *G10L 15/08* (2013.01); *G10L 15/30* (2013.01); *G10L 15/26* (2013.01); *G10L 25/51* (2013.01); *G10L 2015/088* (2013.01); *G10L 2015/223* (2013.01)

(58) Field of Classification Search
USPC ................................. 704/246, 247, 251, 252
See application file for complete search history.

(56) References Cited

U.S. PATENT DOCUMENTS

| | | | |
|---|---|---|---|
| 9,070,366 B1 | 6/2015 | Mathias et al. | |
| 9,263,042 B1 | 2/2016 | Sharifi | |
| 2002/0183894 A1* | 12/2002 | Wang | G16H 40/63 700/245 |
| 2005/0055132 A1* | 3/2005 | Matsumoto | B25J 9/1682 700/245 |
| 2005/0271279 A1* | 12/2005 | Fujimura | G06K 9/00355 382/203 |
| 2011/0054900 A1 | 3/2011 | Phillips et al. | |
| 2012/0179457 A1 | 7/2012 | Newman et al. | |
| 2014/0207442 A1 | 7/2014 | Ganong, III et al. | |
| 2014/0214429 A1 | 7/2014 | Pantel | |
| 2014/0337007 A1 | 11/2014 | Waibel et al. | |
| 2019/0107833 A1* | 4/2019 | Song | G05D 1/0022 |
| 2019/0198018 A1* | 6/2019 | Wang | G10L 25/78 |

\* cited by examiner

*Primary Examiner* — Leonard Saint Cyr
(74) *Attorney, Agent, or Firm* — Fish & Richardson P.C.

(57) ABSTRACT

Methods, systems, and apparatus, including computer programs stored on computer storage devices, for multi-tiered command processing are disclosed. One of the methods includes operating an audio processing system to detect voice commands in a set of first commands controlling behavior of the robot and in a set of second commands controlling behavior of the robot, wherein the system detects commands in the set of first commands using a local recognition model that does not require communication over a network, and detects commands in the set of second commands with a server over a network; executing one or more applications to respond to commands in a set of application commands that include commands different from the first commands and second commands; and detecting and carrying out commands, according to a predetermined hierarchy that prioritizes detection of the first commands first, the second commands second, and the application commands third.

20 Claims, 3 Drawing Sheets

MULTI-TIERED COMMAND PROCESSING

BACKGROUND

This specification relates to audio processing systems.

Voice-activated audio processing systems can receive audio input indicating actions that a user of the system wants to be performed. The audio processing system can then interpret the audio and attempt to perform the actions.

SUMMARY

In some implementations, a robot can include an audio processing system that uses multiple levels of voice command processing. The system can process different types of commands with different audio processing modules, for example, relying on local hardware and speech models for processing for certain types of commands but leveraging remote systems for processing for other types of commands. As a result, the system can prioritize certain commands, such as system commands or commands that promote safety, so that they are detected in a timely manner and are always available to the user. The system also enables detection of more complex general voice commands and voice commands specific to applications currently running on the robot.

The audio processing system can include a local, self-contained speech recognition system to detect a "base" set of commands, such as for safety features (e.g., to recognize commands such as "stop," "let go," "shut down," etc.) and robot management (e.g., for status requests, application switching, diagnostics, etc.). The base commands are detected with a local recognition model and local robot hardware, without needing network access, and evaluation completes within a predetermined amount of time to provide low latency.

The audio processing system also recognizes a more general set of "core" commands. The core commands may be detected using a network service and so may not be guaranteed available at all times and may require a greater amount of time to detect than base commands. However, the core commands may represent more complex robot functions or behaviors, and also allow fine-tuning and extensibility using one or more remote server systems. Like the base commands, the core commands are application-independent so they can be run regardless of which applications may be running.

The audio processing system can also detect voice commands on behalf of third-party applications to enable these applications to respond to custom or application-specific voice commands. This can be achieved by applications registering their commands with the audio processing system, or by the applications receiving the results of speech recognition processing as commands are provided. While applications are running, the base set of commands and the core commands remain available to the user.

In general, the audio processing system of the robot may detect and execute commands in a predetermined sequence, checking for the presence of the base commands first, the core commands second, and the application commands last. When the audio processing system receives audio input from a user, the system may detect which command set the audio input corresponds to, according to a predefined hierarchy of command sets.

In a general aspect, a method includes: operating, by a robot, an audio processing system to detect utterance of voice commands in a set of first commands that control behavior of the robot and in a set of second commands that control behavior of the robot, wherein the audio processing system is configured to detect utterance of voice commands in the set of first commands using a local recognition model of the robot that does not require communication over a network, and the audio processing system is configured to detect utterance of commands in the set of second commands through communication with a server over a network; executing, by the robot, one or more applications that are configured to respond to voice commands in a set of application commands that include commands different from the first commands and second commands; and detecting and carrying out voice commands, by the robot using the audio processing system, according to a predetermined hierarchy that prioritizes detection of the first commands first, the second commands second, and the application commands third, wherein the audio processing system is configured to detect utterance of the first commands, the second commands, and the application commands during execution of the one or more applications by the robot.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

In general, another aspect is a robot that includes one or more physically moveable components, one or more microphones, and a control system configured to actuate the one or more physically moveable components. The robot also includes an audio processing system. The audio processing system can include a local recognition model configured to detect, without communication over a network and using the one or more microphones, utterance of voice commands in a set of first commands that control behavior of the robot. The audio processing system can also include a command selection module configured to distinguish between voice commands in the set of first commands, voice commands in a set of second commands that control behavior of the robot, and voice commands in a set of application commands that include commands different from the first commands and second commands, and wherein the command selection module prioritizes detection of the first commands first, the second commands second, and the application commands third. The robot can further include a hotword model configured to recognize utterance of a reserved word, which is also referred to as a hotword. The aspect can also include a remote server communicatively coupled to the robot, wherein the remote server is configured to detect, using the one or more microphones, utterance of voice commands in the set of second commands and voice commands in the set of application commands.

The remote server can also include a speech recognizer configured to generate a transcription of audio data corresponding to a voice command in the set of second commands or a voice command in the set of application commands. The remote server can also include a semantic analysis module configured to generate a semantic interpretation of the audio data.

Advantageous implementations can include one or more of the following features. The audio processing system of the robot may be configured to complete evaluation of a received voice command to determine whether the received voice command is one of the first commands within a predetermined amount of time from utterance of the voice command; and the audio processing system of the robot may not be guaranteed to complete evaluation of the received voice command to determine whether the received voice command is one of the second commands within a predetermined amount of time from utterance of the voice command.

The audio processing system can also be configured to detect utterance of commands in the set of application commands through communication with a second server over the network.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

Figure 1A:
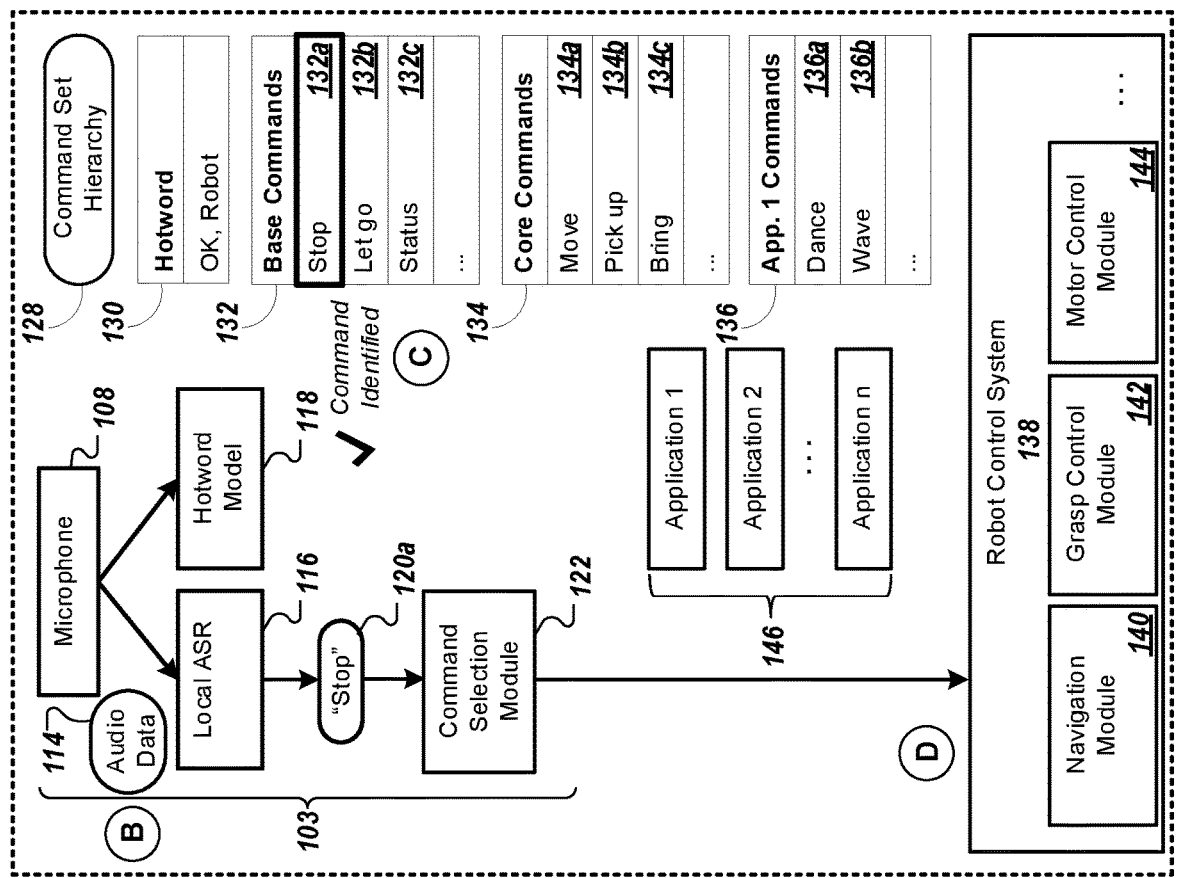
FIGS. 1A and 1B are diagrams that illustrate a system including a robot that uses an audio processing system that can perform multi-tiered command processing.

FIG. 1A is a diagram that illustrates system 100 including a robot 102 that uses an audio processing system 103 that can perform multi-tiered command processing. The system 100 includes a robot 102, a server 104, and a network 106. FIG. 1A shows stages (A) to (D) that illustrate a flow of data.

In the example, the audio processing system 103 of the robot 102 includes a microphone 108 that receives an audio input 110 from a user 112. The microphone 108 converts the audio input 110 into audio data 114 and sends the audio data 114 to a local automatic speech recognizer (ASR) 116 and a hotword model 118. The local ASR 116 and the hotword model 118 can evaluate the audio data 114 substantially in parallel to interpret the content of the received audio.

If the local ASR 116 can determine the words in the audio, the ASR 116 outputs a transcription 120a that corresponds to the audio input 110. This scenario is illustrated in FIG. 1A and discussed further below. The local ASR 116 sends the transcription 120a to a command selection module 122, which determines which command is indicated by the transcription. The robot 102 can then perform the action corresponding to the command.

If neither the local ASR 116 nor the hotword model 118 can determine the words of the audio data 114, then, using the network 106, the robot 102 sends the audio data 114 to a remote automatic speech recognizer (ASR) server 104. This scenario is shown in FIG. 1B.

The remote ASR server 104 may include one or more computers. In some implementations, one or more computers of the remote ASR server 104 may communicate with the robot 102 and one or more other computers to perform a variety of tasks such as speech recognition, text-to-speech processing, analysis of commands, and so on. In the example, the remote ASR server 104 includes a speech recognizer 124 and a semantic analysis module 126.

The network 106 may be a wired network, a wireless network, or a combination of the two. The network 106 may be a public network, a private network, or a combination of the two. The network 106 may also include the Internet.

The microphone 108 may be any device that is configured to receive audio input 110 and convert the audio input into audio data that can be processed by the local ASR 116 or remote ASR server 104.

The local ASR 116 and remote ASR server 104 may each include one or more processors, implemented in hardware, software, or a combination, that are configured to process audio data and estimate the most likely words spoken by the user 112. The local ASR 116 may receive audio data 114 and generate, using the audio data, a transcription 120a of words spoken by a user. Similarly, the speech recognizer 124 of the remote ASR server 104 can generate a transcription 128a. The semantic analysis module 126 of the remote ASR server 104 may generate a semantic meaning 128b of the one or more words spoken by the user. Although not shown in FIG. 1A, like the remote ASR server 104, the local ASR 116 can also include a speech recognizer and semantic analysis module.

The robot 102 may include a command selection module 122, which is a processor that receives transcription and/or semantic interpretation output from the local ASR 116, the remote ASR server 104, and the hotword model 118 and processes the output according to a command set hierarchy 128 to determine how the robot 102 should respond to the audio input 110. The command set hierarchy 128 defines a predetermined order in which the robot 102 should detect and execute audio input 110 received by the audio processing system 103. In this implementation, the command set hierarchy 128 includes the following types, listed from high precedence to low precedence: one or more hotwords 130, base commands 132, core commands 134, and application commands 136.

Figure 1A:
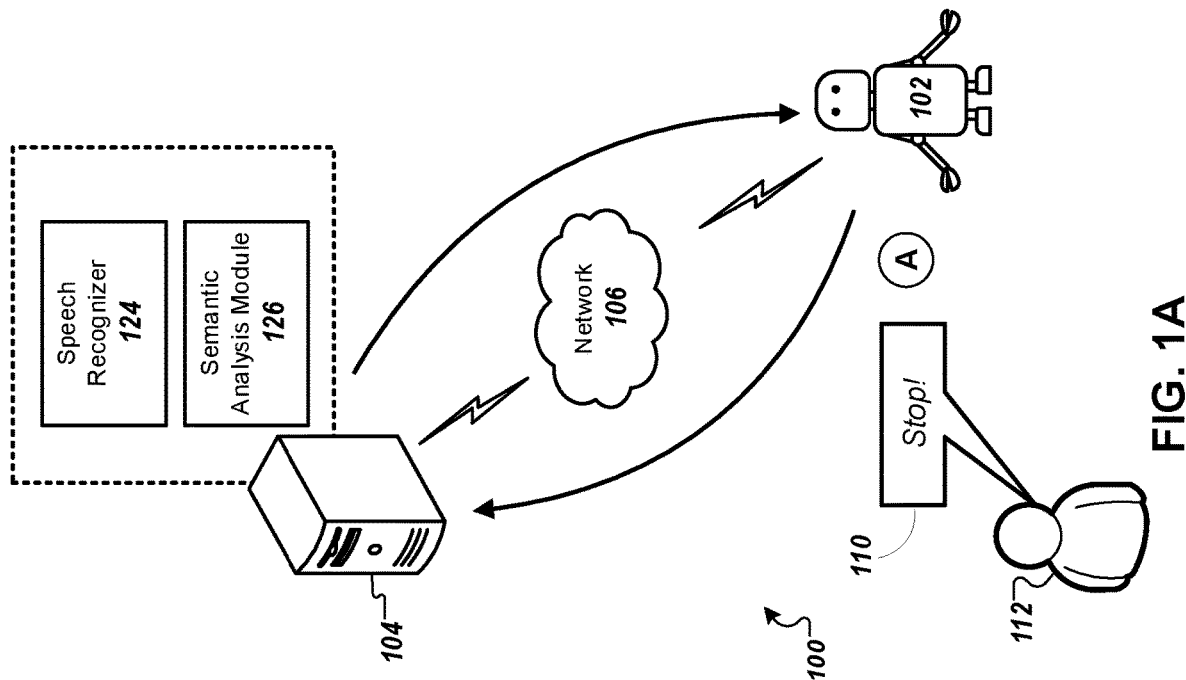
Figure 1B:
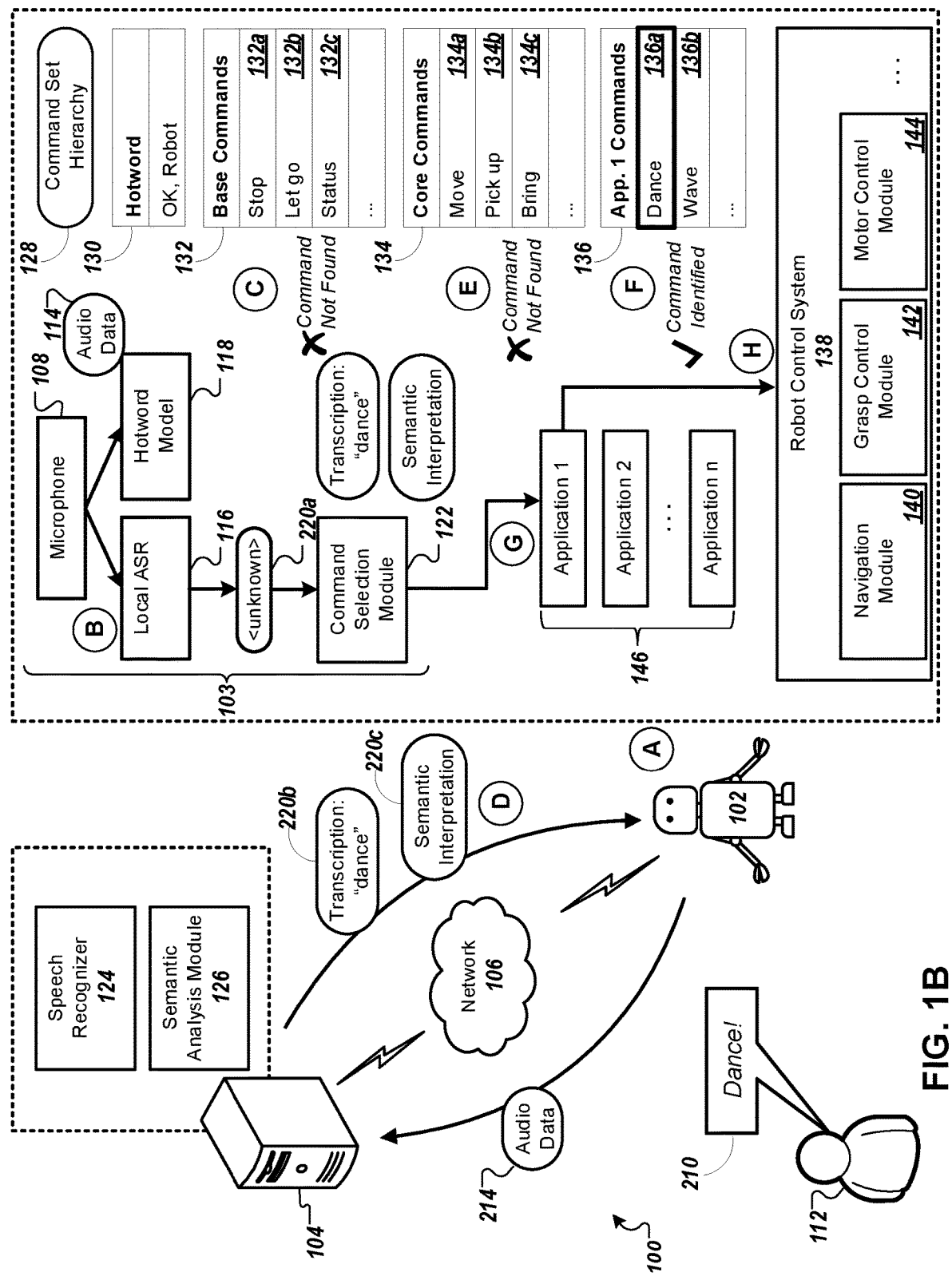

In the example of FIG. 1, hotwords are detected using a dedicated hotword detection model, allowing processing for hotword detection and base command detection to occur substantially in parallel and using separate detection models. In some implementations, the presence of hotwords and base commands may be detected using a single model. For example, a hotword may be one of the base commands, and the robot may treat the identified term as a hotword (e.g., to trigger the robot to wake up or otherwise enter a state to accept and process a voice input immediately following the hotword).

The robot 102 may also include a robot control system 138, which controls the movement of the robot 102. The robot control system 138 may include a navigation module 140, a grasp control module 142, and a motor control module 144. The navigation module 140 may maintain a database that maps transcriptions and/or semantic interpretations of audio input 110 to a set of robot-performable actions that correspond to the audio input. In some implementations, the robot 102 includes one or more grippers that are capable of manipulating objects in the environment of the robot. The grasp control module 142 may be used to control the one or more grippers. The motor control module 144 may be used to control one or more motors of the robot.

The command set hierarchy 128 includes the hotword 130, which the robot is able to detect using the hotword model 118. The hotword model 118 is a local speech recognition processor that receives the audio data 114 from the microphone 108. Because the hotword model 118 is local to the robot 102, the robot can recognize the hotword 130 without a network connection. A user may say the hotword 130 in order to get the attention of the robot 102. The hotword 130 may also precede any one of the base commands 132, core commands 134, or application commands 136. However, in some implementations, the robot is configured to recognize spoken commands that are not preceded by a hotword. For example, the robot may be configured to detect and respond to the utterance of any and all of the base commands even if not preceded by a hotword. In some implementations, the system may be configured to detect and respond to the utterance of some or all of the core commands 134 and/or the application commands 136.

In some implementations, the system may be configured to determine a confidence score that indicates a likelihood that a user is speaking to the robot 102. The system may also be configured to detect and respond to an utterance of some or all of the core commands 134 and/or the application commands 136, in response to determining that the confidence score is above a certain threshold value, indicating a high likelihood that a user is speaking to the robot 102.

In the example of FIG. 1, the hotword 130 corresponds to the words "OK, Robot". In other implementations, the hotword 130 can be any word or words that can be recognized by a speech recognition processor such as the hotword model 118. For example, the hotword can be specified by a designer of the robot. As another example, users of the robot may define their own hotwords. Also in the illustrated example, the command set hierarchy 128 includes one hotword; although, in other implementations, the command set hierarchy can include more than one hotword.

In addition to the hotword 130, the command set hierarchy 128 also includes the set of base commands 132, which are recognized by the local ASR 116. The robot 102 can recognize the base commands 132 without a network connection to allow a user to access the base commands at any time during use of the audio processing system 103, including if the robot is currently running an application or if the robot is in the process of performing a task. The base commands 132 may include commands related to safety, e.g., commands that a user may want urgent access to with minimum delay. The base commands 132 may also include commands related to determining the overall status of the robot 102 or the status of a component of the robot 102.

In the example of FIG. 1, the base commands include a "stop" base command 132a. This command may be used, for example, to instruct the robot 102 to suspend an action being performed by the robot 102 and prevent the robot 102 from performing any further actions until a user specifies otherwise. For example, if the robot 102 is performing a first task, but the user 112 wants to the robot to stop working on the first task and begin working on a second task, the user can say "Stop" to prevent the robot from performing the first task. After the robot has stopped performing the first task, the user can prompt the user, e.g., through a verbal command, to begin working on the second task. As another example, the robot 102 may be a mobile robot capable of moving in two or three dimensions. In this example, if the user 112 sees that the robot 102 is moving towards an area that the user does not want the robot to occupy, e.g., if the robot is moving towards the top of a flight of stairs or if the robot is headed outside during a rainstorm, the user can say "stop" to cause the robot 102 to halt its motion.

The base commands may also include a "let go" base command 132b. The let go base command 132b may be used to prompt the robot 102 to release an object that the robot is manipulating with a gripper. For example, if the user 112 orders the robot 102 to retrieve an object but the robot grasps the wrong object, then the user may say "let go" to cause the robot 102 to release the grasped object.

The base commands may also include a "status" base command 132c. The user 112 may say "status" to determine a variety of information related to what the robot 102 is currently doing, what the current settings of the robot are, and what the battery state of the robot is, to list a few examples. In response to the "status" base command 132c, the robot can communicate, for example, the name of an application that the robot is running or a user request that the robot is currently working on. The user 112 may also use the status base command 132c to determine current settings of the robot, for example, the network that the robot is connected to, the signal strength of the network connection, and the availability of system updates. In response to receiving the status base command 132c, the robot 102 can also provide battery information, such as the percent charge of the battery and the remaining time the battery will last. A user 112 may also use the status base command 132c to diagnose a problem with the robot 102 (e.g., a hardware or software malfunction or a network connectivity issue).

In addition to the base commands 132, the command set hierarchy 128 also includes the set of core commands 134, which are recognized using the remote ASR server 104. The core commands 134 can instruct the robot 102 to perform various common actions which may be applicable in a variety of situations, e.g., in general use and while many different applications are active. For example, the core commands 134 may involve communications to the robot 102 regarding robot movement, robot navigation, object manipulation, information retrieval, general human-robot interaction, and so on. Typically, the core commands 134 relate to actions for which some moderate or variable delay in processing is acceptable, and so highly-predictable, low-latency detection is not necessary as it may be in some instances for base commands 132. Because the core commands 134 are processed using the remote ASR server 104, at least in some implementations, it may take longer for the robot 102 to detect and act on the core commands 134 than the base commands 132, which are detected using models local to the robot 102. Like the base commands 132, the core commands 134 may be accessed regardless of which applications the robot 102 is currently running. The core commands 134 may instruct more complete and complex robot functions or behaviors than the base commands 132. The set of core commands 134 and the manner in which they are detected can also be easily updated using the remote ASR server 104. For example, the words and phrases of commands recognized as the base commands 132 may be fine-tuned and extended at the remote ASR server 104. This can allow the robot 102 to respond to new and larger sets of voice inputs from users (e.g., due to adjustments and enhancements to the remote ASR server 104), without requiring any modification to the robot 102 itself.

The core commands may include, for example, a "move" core command 134a, a "pick up" core command 134b, and a "bring" core command 134c. The user 112 may say "move" to prompt the robot 102 to move, "pick up" to prompt the robot to pick up an object, or "bring" to prompt the robot to bring an object to the user. The "pick up" core command 134b and "bring" core command 134c can be followed by descriptions to specify an object that the user wants the robot 102 to pick up or bring. Similarly, the "move" core command 134a can be followed by a direction or a location to specify where the user wants the robot 102 to move.

In addition to the standard functionality provided by the base commands 132 and the core commands 134, the audio processing system 103 may provide functionality enabling one or more third-party applications to define custom, application-specific voice commands. Once registered, the robot 102 may detect and respond to application-specific voice commands even if the corresponding application is not running. For example, upon detecting that an application-specific voice command was spoken, the robot 102 can identify the corresponding application, execute the application, and notify the application which command was spoken (e.g., by providing an identifier for the command and/or providing a transcription of the command).

In the example, the robot 102 provides a user access to one or more third-party applications, such as the applications 146, which are executed by the robot 102. Each application of the applications 146 can have its own corresponding set of application commands (e.g., voice commands for the application) related to the functionality of the application. The applications specify the voice commands to be detected, and the audio processing system 103 processes the audio and determines when one of the indicated voice commands occurs. Then, when an application command is spoken, the audio processing system 103 identifies the command and notifies the corresponding application that the command was spoken. Typically, application commands are detected using the capabilities of the remote ASR server 104. For example, the robot 102 may use the remote ASR server 104 to obtain text representing user speech (e.g., a transcription), and the robot 102 may assess whether the text matches any application-specific command. As another example, the robot may indicate to the remote ASR server 104 the set of application-specific commands that applications on the robot 102 are configured to detect. Then, the remote ASR server 104, when processing audio sent by the robot 102, may determine if the audio represents the utterance of any of the application-specific commands in the set.

In some implementations, each of the applications 146 may register one or more commands with the audio processing system 103. That is, in addition to determining whether audio data 114 received from the user 112 represents a hotword, a base command, or a core command, the robot 102 may also determine whether the audio data represents a command specific to an application. In the example of FIG. 1A, the applications 146 include application 1, which may have a set of voice commands shown as "application 1 commands" 136 that the application relies on the audio processing system 103 to detect. The application 1 commands 136 may include a "dance" application command 136a and a "wave" application command 136b. Application 1 can register the application 1 commands 136 with the audio processing system 103 so that the robot 102 can identify these commands. To register commands with the audio processing system 103, and application may use a predetermined application programming interface (API) designated for this purpose. For example, using the API, the application may specify an identifier or code for the command and one or more words or phrases (or other acoustic characteristics representing an utterance of the command) that define the voice command. The application 1 may provide, for example, an identifier, e.g., "1", for a command and also specify the word "dance" as the word that is spoken as the voice command.

As noted above, the audio processing system 103 can detect application specific voice commands, and this avoids the redundancy of individual applications each receiving and processing audio data to determine whether their set of commands were spoken. Nevertheless, in some implementations, applications may receive and process data from the remote ASR server 104 to determine whether any command relevant to the application was spoken. For example, when the remote ASR 104 provides information about an utterance, the robot 102 can receive the transcription 120b and semantic interpretation 120c and send this information directly to one or more of the applications 146. When one of the applications 146 recognizes the command, the application can prompt the robot control system 138 to execute the one or more actions that correspond to the command.

A user may speak a command to cause the robot 102 to begin executing one of the applications 146. For example, in response to the user 112 saying "dance", the robot 102 can detect the utterance and determine that it represents a previously-registered application command of a particular application. In this example, the robot 102 determines that the utterance represents the dance command 136a and that the application that corresponds to the dance command is application 1. The robot 102 can determine whether application 1 is currently running. If the application is currently running, the robot 102 can notify the application which command was spoken. If the application is not currently running, the robot 102 can initiate execution of the application, and then notify the application which command was spoken. The application can then prompt the robot control system 138 to execute the one or more actions that correspond to the dance command 136a.

In some implementations, the robot 102 can run multiple applications at one time. As another example, the applications 146 can include a cleaning application, which can include a vacuum command. The applications 146 can also include a music player application, which may allow the user 112 to prompt the robot 102 to output music using one or more speakers of the robot. The user 112 may prompt the robot 102 to vacuum, which starts the cleaning application. While the robot 102 is running the cleaning application, the user 112 can activate the music application, e.g., by saying "play my songs on shuffle". In this example, the robot can both vacuum, using the cleaning application, and play music, using the music player application.

In some implementations, when the robot 102 is running multiple applications concurrently, one of the applications may run in the foreground while another application may run in the background. The core commands 134 may include an application switching command that allows a user to run, in the foreground, an application that is currently running in the background. For example, the user 112 can switch between a first running application, e.g., application 1, and a second application, e.g., application 2, by speaking the command "switch to application 2".

In addition to speaking the switching command, the user 112 can also switch from the first application to the second application by speaking a command that is part of the command set of one of the applications. For example, the robot 102 running a first, cleaning application in the foreground, may be washing dishes in the kitchen of the user 112, when the user speaks a command of a second application. The command spoken by the user 112 may require the robot 102 to allocate physical resources differently, as compared to when the robot is running the first application. As an example, the command may be "set the dining room table". The robot 112 may identify the command and determine that the command corresponds to a second application, in this example, a table bussing application. The robot 112 may determine that the second application requires the robot to move from the kitchen to the dining room. The robot 112 may also determine that the second application requires a resource that is currently being used by the first application, e.g., a grasping arm that was being used to wash dishes and is now required for use setting the dining room table. In response to the determination that the robot must change locations and reallocate one or more physical resources, the robot can move to the dining room and switch the table bussing application to the foreground. Once the table bussing application is running in the foreground, it may prompt the robot control system 138 to actuate the grasping arm to respond to the command to set the table.

The robot 102 may also be configured to respond to application commands from any of multiple applications that may be running concurrently, regardless of whether an application is running in the foreground or background.

In general, the base commands 132, core commands 134, and application commands 136 are independent of one another. That is, the robot 102 can recognize and act on a first command, e.g., an application command, without a user speaking any of the base commands or core commands first.

In the example of FIG. 1A, during stage (A), a robot 102 is running an application, such as one of the applications 146. While the robot 102 is running the application, the robot may also be performing an action and listening for audio input using the microphone 108.

During stage (B), the microphone 108 detects audio input 110, e.g., speech from the user 112 in the environment of the robot 102. The microphone provides signals representing the audio input 110, which are stored as audio data 114. In the example of FIG. 1A, the audio input 110 is an utterance of the word "stop", e.g., the "stop" base command 132a of the base commands 132. The audio processing system 103 sends audio data 114 to the hotword model 118 and the local ASR 116, and the remote ASR server 104. The hotword model 118 and the local ASR 116 have the highest priority and can perform processing to recognize hotwords and base commands 132, respectively, substantially in parallel. In some implementations, the audio data 114 is sent to the remote ASR server 104 when neither the hotword model 118 nor the local ASR 116 detects a command. In other implementations, the audio data 114 is sent to the remote ASR server 104 before the processing with the hotword model 118 and the local ASR 116 is completed, to reduce latency in receiving a response in the event that the utterance is one of the core commands 134 or application commands.

In the example, the "stop" base command 132a is one of the base commands 132, and so the local ASR 116 identifies that the "stop" base command was spoken.

During stage (C), the local ASR 116 generates a local output 120a that indicates the recognized content of the audio input 110. In the example of FIG. 1A, the local output 120a is the transcription "Stop," but the nature of the detected command may be communicated in other ways, such as by an identifier or code assigned to the word "stop" or the "stop" base command 132a.

The local ASR 116 sends the local output 120a to the command selection module 122, which determines whether the local output 120a corresponds to a hotword or a base command. The command selection module 122 determines that the local output 120a corresponds to the stop base command 132a. For example, data representing each command that can be recognized by the robot 102 may be stored in a database that is searchable by the command selection module 122. Therefore, the command selection module can query the database, e.g., using the local output 120a that represents the transcription "Stop", and determine that the local output corresponds to the stop base command 132a.

In stage (D), the robot executes actions to respond to the identified voice command. In response to determining that the local output 120a represents the "stop" base command 132a, the command selection module 122 can communicate data indicating the identified command to the robot control system 138. For example, the data corresponding to the identified command may be an identifier that indicates to which command the audio data 114 corresponds. The robot control system 138 can receive the data indicating the identified command and identify one or more actions to perform that appropriately respond to the identified command. For example, the robot control system 138 may communicate the data indicating the identified command to the navigation module 140, which may determine a set of actions that should be performed by the robot 102 in response to the local output 120a. The navigation module 140 may communicate the set of actions to the other modules of the robot control system 138, such as the grasp control module 142 and the motor control module 144, to execute the set of actions.

In the example of FIG. 1A, the navigation module 140 may receive, from the command selection module 122, an identifier for the "stop" base command 132a, and determine the set of actions to be performed in response to the stop base command. Depending on the state of the robot 102 when the command is spoken, the robot 102 may perform various actions. For example, if the robot 102 is moving, the actions may include stopping the motion. If the robot 102 is performing a task, the robot 102 may pause or cancel the task. As further examples, the set of actions may include resetting the robot to a home state (e.g., a state in which all grippers are in a release position) or ending all motor functions of the robot 102. In the example of FIG. 1A, the navigation module 140 can communicate the set of actions corresponding to the stop base command 132a to the grasp control module 142, which can prompt all grippers of the robot to transition to a release position. The navigation module 140 can also communicate the set of actions to the motor control module 144, which can prompt all motors of the robot to stop functioning.

Referring now to FIG. 1B, this example shows the example audio processing system 103 receiving one of the application 1 commands 136. In FIG. 1B, during stage (A), the robot 102 is running an application, such as one of the applications 146. During stage (B), the microphone 108 detects audio input 210 which includes an utterance of the "dance" application command 136a. Signals from the microphone are converted into audio data 214, which are sent to the local ASR 116 and the hotword model 118.

During stage (C), the audio processing system 103 processes the audio data 114 using the local ASR 116 and the hotword model 118. The local ASR 116 generates a local output 220a that indicates that the audio data 214 does not correspond to one of the base commands 132. The local ASR 116 may generate, for example, scores for different base commands that all show a likelihood or confidence less than a predetermined threshold required for detection of a command. When a processing module such as the remote ASR server 104, the local ASR 116, or hotword model 118 does not recognize audio input, it may generate an output, like the local output 220a, that indicates that speech content of the audio input is not recognized. As an alternative, a processing module may simply provide no output to signify that no command was recognized. For example, the hotword model 118 may not recognize that the audio data 214 corresponds to a command. Accordingly, the hotword model 118 does not generate an output and the selection module determines that the audio data 214 does not correspond to a hotword. In some implementations, the hotword model 118 generates an output that signals that it has completed processing the audio data 214 and that a hotword was not detected.

Output from the local ASR 116 and/or hotword model 118 may be sent to the command selection module 122. In this instance, where the local ASR 116 and hotword model 118 did not detect any command from the audio data, additional information is needed from the remote ASR 104 before the command is identified.

The local ASR 116 can be configured to complete evaluation of audio data 214 to determine if the audio data corresponds to one of the base commands 132 within a predetermined amount of time from when the audio data 114 is input to the local ASR 116. This, in turn, can give the robot 102 predictability in detecting and responding to the base commands within a predetermined time from the utterance of a command. The hotword model 118 can similarly be configured to complete evaluation of audio data 214 within a predetermined amount of time. Therefore, in the illustrated example, if more than the predetermined amount of time has elapsed, the command selection module 122 may determine that the local ASR 116 did not classify the audio data 214 as describing an utterance of any of the base commands 132, and the hotword model 118 did not classify the audio data 214 as describing an utterance of the hotword 130.

In other implementations, the command selection module 122 may determine that the audio data 114 has not been classified as one of the base commands 132 or as the hotword 130 from output generated by the local ASR 116 and hotword model 118, respectively. For example, both the local ASR 116 and the hotword model 118 may generate output that indicates that the audio data 214 was not identified to be any of the base commands 132 or the hotword 130.

After determining that the audio data 214 does not correspond to one of the base commands 132 or the hotword 130, the command selection module 122 may cause the audio data 214 to be sent to the remote ASR server 104, so that it may generate a transcription and/or semantic interpretation of the audio data.

During stage (D), the robot 102 receives output from the remote ASR server 104. The output includes a transcription 220b and a semantic interpretation 220c generated by the speech recognizer 124 and the semantic analysis module 126, respectively. In the example of FIG. 1B, the audio input 210 includes an utterance of the "dance" application command 136a. The speech recognizer 124 generates the transcription 220b, which represents the word "dance".

The semantic interpretation 220c may indicate information in addition to the transcription 220b that the system can use towards executing a command. For example, a user may say "dance salsa", resulting in a semantic interpretation that represents a specific type of dance, i.e., salsa.

During stage (E), the robot 102 processes the transcription 220b and semantic interpretation 220c to determine if any command is recognized. In this process, the robot 102 considers the different sets of command in the command set hierarchy 128 in an ordered, prioritized manner. For example, the robot 102 evaluates the transcription 220b according to the command set hierarchy 128 by first checking if the transcription and semantic interpretation represent any of the core commands 134. The command selection module 122 determines that the transcription 220b and semantic interpretation 220c do not represent any of the core commands 134 (e.g., none of the core commands 134 have acoustic similarity to the audio data above a predetermined minimum threshold). As dictated by the command set hierarchy 128, the command selection module 122 proceeds to check whether the transcription 220b and semantic interpretation 220c represent any of the application commands 136, by sequentially checking whether the transcription 220b and semantic interpretation 220c represent a command of application 1, then application 2, and so on until finally checking application n. In some implementations, the sets of application commands may be prioritized among themselves, so that evaluation of voice commands of some applications has priority over evaluation for voice commands of other applications. In other applications, application commands for all applications may be considered together as part of a single command set.

During stage (F), the robot 102 determines that the transcription 220b and semantic interpretation 220c represent the "dance" application command 136a, of application 1. The robot 102 may maintain a mapping of transcriptions and/or semantic interpretations of commands to applications that recognize those transcriptions and/or semantic interpretations. For example, the robot 102 can generate the mapping when each of the applications 146 register one or more commands with the audio processing system 103. The robot 102 may use the mapping to identify the appropriate application corresponding to a detected command, therefore notifying the relevant application instead of applications that are unrelated to the detected command.

During stage (G), the command selection module 122 notifies application 1 that the "dance" application command 136a has been detected. That is, the command selection module 122 may communicate, to application 1, data indicating that an utterance of the particular "dance" application command 136a has been detected. For example, the data corresponding to the command may include an identifier for the command, to specify which command was detected. As another example, the data corresponding to the command may include the transcription 220b and/or the semantic interpretation 220c. If the application 1 is not currently running, the robot 102 may initiate execution of the application. In response to receiving the data corresponding to the command, application 1 may perform operations of the application to carry out the actions requested by the user through speaking the command. In some implementations, application 1 can maintain a database that maps each of the application 1 commands 136 to sets of actions that correspond to each command.

During stage (H), application 1 sends the set of actions to be performed by the robot to the robot control system 138. The robot control system 138 may communicate the set of actions to the other modules of the system, such as the grasp control module 142 and the motor control module 144, which can activate one or more grippers and/or one or more motors to perform the set of actions.

Figure 2:
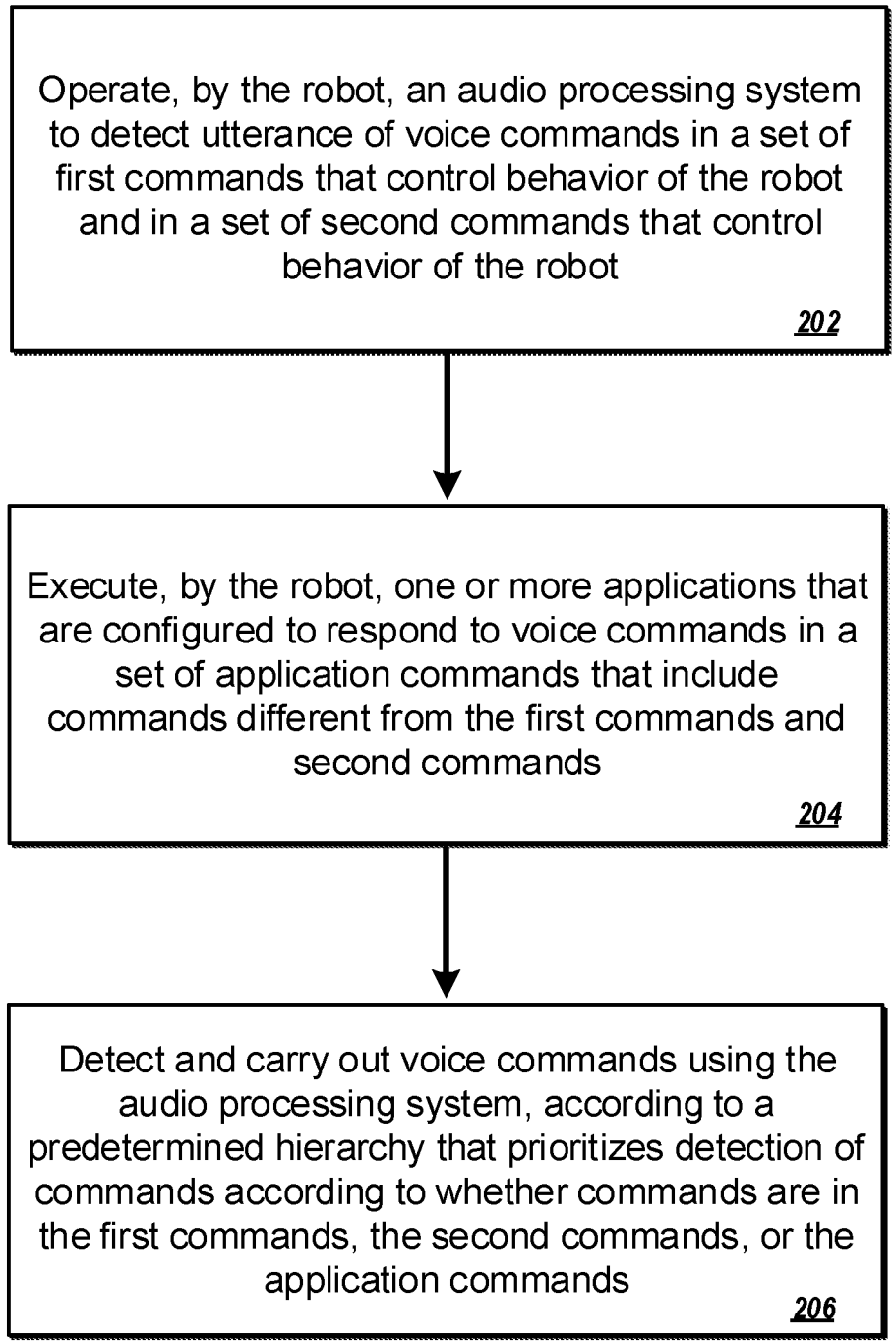
FIG. 2 is a flow diagram illustrating an example of a process for multi-tiered command processing.

FIG. 2 is a flow diagram illustrating an example process 200 for detecting and carrying out voice commands. The process 200 can be performed by one or more processing devices of a robot. As discussed above, local, onboard functionality to detect and respond to certain classes or sets of voice commands (e.g., base commands) in less than a predetermined delay is particularly advantageous for robots and other devices that are capable of locomotion and/or manipulation of their environment, since requirements for safety and precise control are increased relative to other types of devices. For example, commands to cause a robot to halt its locomotion or release an object may need to be recognized even under adverse circumstances (e.g., with no network access or server outages) and with guaranteed and deterministic low latency to avoid harm. Similarly, robots benefit from functionality to concurrently leverage remote speech recognition resources to detect and respond to other commands with lesser levels of priority (e.g., core commands and application commands), especially since the various sets of potential commands may be complex and changing. As part of providing this functionality, the interactions of the system enable a system to register application-specific voice commands for detection, without having to train a local speech recognition model on the robot, and make the command available to the user even when the corresponding application is not running, resulting in increased flexibility in command options while allowing power savings, since applications need not be executed for their application-specific functionality to be invoked through voice commands.

While the process 200 is described as being performed by a robot, it can be advantageously performed by other types of processing devices, such as a client device, a server system, or a combination of both a client device and a server system. As additional examples, a processing device may be a mobile phone, smart phone, personal digital assistant (PDA), music player, e-book reader, tablet computer, wearable computing device such as a watch, glasses, or necklace, laptop computer, desktop computer, or other portable or stationary computing device. As additional examples, a processing device may be a central processing unit (CPU) of a device, a particular processing core within a CPU, and so on. In the discussion below, the techniques indicated to be performed by a robot may be performed by, for example, the audio processing system 103 of the robot 102 of FIGS. 1A and 1B and/or by other processing elements of the robot 102.

The robot operates an audio processing system to detect the utterance of voice commands in a set of first commands that control behavior of the robot. Concurrently, the robot can use the audio processing system to detect the utterance of voice commands in a set of second commands that control behavior of the robot. The audio processing system is configured to detect the utterance of voice commands in the set of first commands using a local recognition model of the robot that does not require communication over a network. The audio processing system is also configured to detect the utterance of commands in the set of second commands through communication with a server over a network (202). For example, the robot can receive a voice command from a user. The robot may analyze the voice command to determine whether the command is one that belongs to the first set of commands, which the robot can detect using a local recognition model, or whether the command is one that belongs to the second set of commands that the robot can detect using a server communicatively coupled to the robot by a network.

In some implementations, the audio processing system of the robot is configured to complete evaluation of a received voice command (e.g., to determine whether the received voice command is one of the first commands) within a predetermined amount of time from utterance of the voice command. Because the local recognition model of the robot does not require communication over a network, the robot may process audio corresponding to one of the first commands without experiencing latency caused by communicating with a server over a network.

In some implementations, the audio processing system of the robot is not guaranteed to complete evaluation of the received voice command (e.g., to determine whether the received voice command is one of the second commands and/or application commands) within a predetermined amount of time from utterance of the voice command. Unlike the first set of commands that are detected using a local recognition model, the second set of commands may be detected using a server connected to the robot by a network. Therefore, server round-trip time must be taken into account when considering the amount of time it takes for the robot to detect a command in the second set of commands. Further, the server may not provide results with guaranteed timing, and so the amount of time to get speech recognition results may vary for different requests (e.g., due to complexity of the input, load on the server, and other factors). In addition, network connectivity issues may cause a delay in the communication of the robot with the server, resulting in a delay in the recognition of voice commands in the set of second commands.

The robot executes one or more applications that are configured to respond to voice commands in a set of application commands that include commands different from the first commands and second commands (204). The application commands can recognized by one or more third-party applications. The third-party applications may be stored on one or more storage devices of the robot, e.g., local hardware storage devices such as hard disks, solid-state drives, or other memory of the robot. In some implementations, the third-party applications may additionally or alternatively be stored remotely with respect to the robot, and can be accessed by the robot through a network connection.

The robot detects and carries out voice commands using the audio processing system, according to a predetermined hierarchy that prioritizes detection of the first commands first, the second commands second, and the application commands third. The audio processing system is configured to detect utterance of the first commands, the second commands, and the application commands during execution of the one or more applications by the robot (206). For example, the robot can generate a transcription and/or semantic interpretation of detected audio data that corresponds to a voice command. The robot can use the transcription and/or semantic interpretation to determine the appropriate voice command to carry out. In some implementations, the robot can access a mapping of transcriptions and/or semantic interpretations to applications that recognize those transcriptions and/or semantic interpretations, to determine an application that the voice command corresponds to.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A method performed by a robot, the method comprising:

operating, by the robot, an audio processing system to detect utterance of voice commands in a set of first commands that control behavior of the robot and in a set of second commands that control behavior of the robot, wherein the audio processing system is configured to detect utterance of voice commands in the set of first commands using a local recognition model of the robot that does not require communication over a network, and the audio processing system is configured to detect utterance of commands in the set of second commands through communication with a server over a network;
executing, by the robot, one or more applications that are configured to respond to voice commands in a set of application commands that include commands different from the first commands and second commands;
receiving, by the robot, audio data for an utterance; and
processing, by the robot using the audio processing system, the audio data for the utterance to evaluate the utterance with respect to each of the set of first commands, the set of second commands, and the set of application commands, wherein the processing is performed according to a predetermined hierarchy that prioritizes detection of the first commands first, the second commands second, and the application commands third, wherein the audio processing system is configured to detect utterance of the first commands, the second commands, and the application commands during execution of the one or more applications by the robot.

2. The method of claim 1, wherein the audio processing system of the robot is configured to complete evaluation of a received voice command to determine whether the received voice command is one of the first commands within a predetermined amount of time from utterance of the voice command; and
wherein the audio processing system of the robot is not guaranteed to complete evaluation of the received voice command to determine whether the received voice command is one of the second commands within a predetermined amount of time from utterance of the voice command.

3. The method of claim 1, wherein the audio processing system is configured to detect utterance of commands in the set of application commands through communication with a second server over the network.

4. The method of claim 1, wherein the voice commands in the set of first commands include a reserved word.

5. The method of claim 1, wherein the voice commands in the set of first commands include a stop command, a let go command, or a status command.

6. The method of claim 1, wherein the voice commands in the set of second commands include a move command, a pick up command, or a bring command.

7. The method of claim 1, wherein processing the audio data for the utterance comprises:
processing the audio data for the utterance to detect the first set of commands using the local recognition model while concurrently using a server-based recognition process to process the audio data for the utterance to detect the set of second commands and the set of application commands.

8. A system comprising:
a robot that includes:
one or more physically moveable components,
one or more microphones,
a control system configured to actuate the one or more physically moveable components,
an audio processing system that includes:
a local recognition model configured to detect, without communication over a network and using the one or more microphones, utterance of voice commands in a set of first commands that control behavior of the robot,
a command selection module configured to distinguish between voice commands in the set of first commands, voice commands in a set of second commands that control behavior of the robot, and voice commands in a set of application commands that include commands different from the first commands and second commands, and wherein the command selection module prioritizes detection of the first commands first, the second commands second, and the application commands third, and
a hotword model configured to recognize utterance of a reserved word; and
a remote server communicatively coupled to the robot, wherein the remote server is configured to provide a speech recognition service configured to detect voice commands in the set of second commands and voice commands in the set of application commands;
wherein the robot is configured to receive audio data for an utterance and process the audio data for the utterance by (i) using the local recognition model evaluate the audio data for the utterance with respect to each of the set of first commands, and (ii) using the speech recognition service provided by the remote server to evaluate the audio data for the utterance with respect to the set of second commands and the set of application commands.

9. The system of claim 8, wherein the remote server includes:
a speech recognizer configured to generate a transcription of audio data corresponding to a voice command in the set of second commands or a voice command in the set of application commands; and
a semantic analysis module configured to generate a semantic interpretation of audio data corresponding to a voice command in the set of second commands or a voice command in the set of application commands.

10. The system of claim 8, wherein the audio processing system is configured to detect utterance of commands in the set of second commands through communication with the remote server over the network.

11. The system of claim 8, wherein the audio processing system is configured to detect utterance of commands in the set of application commands through communication with the remote server over the network.

12. The system of claim 8, wherein the audio processing system of the robot is configured to complete evaluation of a received voice command to determine whether the received voice command is one of the first commands within a predetermined amount of time from utterance of the voice command; and
wherein the audio processing system of the robot is not guaranteed to complete evaluation of the received voice command to determine whether the received voice command is one of the second commands within a predetermined amount of time from utterance of the voice command.

13. The system of claim 8, wherein the reserved word is a wake word for the robot.

14. The system of claim 8, wherein the voice commands in the set of first commands include a stop command, a let go command, or a status command.

15. The system of claim 8, wherein the voice commands in the set of second commands include a move command, a pick up command, or a bring command.

16. One or more computer-readable storage devices storing a computer program, the program comprising instructions that when executed by one or more computers cause the one or more computers to perform operations comprising:
- operating, by the robot, an audio processing system to detect utterance of voice commands in a set of first commands that control behavior of the robot and in a set of second commands that control behavior of the robot, wherein the audio processing system is configured to detect utterance of voice commands in the set of first commands using a local recognition model of the robot that does not require communication over a network, and the audio processing system is configured to detect utterance of commands in the set of second commands through communication with a server over a network;
- executing, by the robot, one or more applications that are configured to respond to voice commands in a set of application commands that include commands different from the first commands and second commands; and
- receiving, by the robot, audio data for an utterance; and
- processing, by the robot using the audio processing system, the audio data for the utterance to evaluate the utterance with respect to each of the set of first commands, the set of second commands, and the set of application commands, wherein the processing is performed according to a predetermined hierarchy that prioritizes detection of the first commands first, the second commands second, and the application commands third, wherein the audio processing system is configured to detect utterance of the first commands, the second commands, and the application commands during execution of the one or more applications by the robot.

17. The one or more computer-readable storage devices of claim 16, wherein the audio processing system of the robot is configured to complete evaluation of a received voice command to determine whether the received voice command is one of the first commands within a predetermined amount of time from utterance of the voice command; and
- wherein the audio processing system of the robot is not guaranteed to complete evaluation of the received voice command to determine whether the received voice command is one of the second commands within a predetermined amount of time from utterance of the voice command.

18. The one or more computer-readable storage devices of claim 16, wherein the audio processing system is configured to detect utterance of commands in the set of application commands through communication with a second server over the network.

19. The one or more computer-readable storage devices of claim 16, wherein the voice commands in the set of first commands include a reserved word.

20. The one or more computer-readable storage devices of claim 16, wherein the voice commands in the set of first commands include a stop command, a let go command, or a status command.

* * * * *